US012059903B2

(12) United States Patent
Yabe

(10) Patent No.: US 12,059,903 B2
(45) Date of Patent: Aug. 13, 2024

(54) STORAGE DEVICE AND LIQUID EJECTION APPARATUS

(71) Applicant: CANON KABUSHIKI KAISHA, Tokyo (JP)

(72) Inventor: Kazunori Yabe, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/181,490

(22) Filed: Mar. 9, 2023

(65) Prior Publication Data

US 2023/0211613 A1 Jul. 6, 2023

Related U.S. Application Data

(62) Division of application No. 17/352,153, filed on Jun. 18, 2021, now Pat. No. 11,628,673.

(30) Foreign Application Priority Data

Jul. 7, 2020 (JP) ................................ 2020-116901

(51) Int. Cl.

| | |
|---|---|
| ***B41J 2/175*** | (2006.01) |
| ***B41J 29/02*** | (2006.01) |
| ***B41J 29/13*** | (2006.01) |
| *B41J 2/17* | (2006.01) |

(52) U.S. Cl.

CPC ....... *B41J 2/17536* (2013.01); *B41J 2/17509* (2013.01); *B41J 2/1752* (2013.01); *B41J 29/02* (2013.01); *B41J 29/13* (2013.01); *B41J 2002/1742* (2013.01)

(58) Field of Classification Search

CPC .. B41J 2/17509; B41J 2/1752; B41J 2/17536; B41J 2002/1742; B41J 29/02; B41J 29/13

See application file for complete search history.

(56) References Cited

U.S. PATENT DOCUMENTS 5,721,576 A * 2/1998 Barinaga .............. B41J 2/17506 347/85
5,949,459 A * 9/1999 Gasvoda .............. B41J 2/17513 347/86
6,079,823 A 6/2000 Droege .................... B41J 2/175

(Continued)

FOREIGN PATENT DOCUMENTS

CN 211138625 U 7/2020
JP 2001-510752 8/2001

(Continued)

OTHER PUBLICATIONS

Office Action dated Mar. 12, 2024 in counterpart Japanese Application No. 2020-116901, together with English translation thereof.

*Primary Examiner* — Anh T Vo
(74) *Attorney, Agent, or Firm* — Venable LLP

(57) ABSTRACT

Provided is a storage device including a container that includes an accommodation chamber accommodating fluid or powder, a flexible film that is bonded to the container and covers an opening portion of the accommodation chamber, and a tank holder to which the container having the film bonded thereto is fixed by a screw, in which the screw penetrates the film and fixes the container to the tank holder, and a part of a bonded portion between the film and the container surrounds a portion of the film through which the screw penetrates.

13 Claims, 7 Drawing Sheets

(56) References Cited

U.S. PATENT DOCUMENTS

| | | | | |
|---|---|---|---|---|
| 6,318,850 | B1 * | 11/2001 | Childers | B41J 2/1752 347/85 |
| 8,602,528 | B2 | 12/2013 | Tominaga et al. | B41J 2/135 |
| 9,908,352 | B2 | 3/2018 | Kimura et al. | B41J 29/377 |
| 10,293,615 | B2 | 5/2019 | Kawagoe et al. | B41J 2/175 |
| 10,870,284 | B2 * | 12/2020 | Osakabe | B41J 29/13 |
| 2008/0036825 | A1 | 2/2008 | Zhang | B41J 2/175 |
| 2014/0043408 | A1 | 2/2014 | Kudo et al. | B41J 2/175 |
| 2014/0238926 | A1 | 8/2014 | Yamagishi et al. | B41J 2/175 |
| 2015/0197097 | A1 * | 7/2015 | Kobayashi | B41J 29/02 347/92 |

FOREIGN PATENT DOCUMENTS

| | | |
|---|---|---|
| JP | 2012-179894 | 9/2012 |
| JP | 2013-158995 | 8/2013 |
| JP | 2013-202848 | 10/2013 |
| JP | 2014-058087 | 4/2014 |
| JP | 2016-175275 | 10/2016 |
| JP | 6035867 B2 | 11/2016 |
| JP | 2017-071095 | 4/2017 |

* cited by examiner

STORAGE DEVICE AND LIQUID EJECTION APPARATUS

This application is a divisional of application Ser. No. 17/352,153 filed Jun. 18, 2021, currently pending; and claims priority under 35 U.S.C. § 119 from Japanese Patent Application No. 2020-116901 filed in Japan on Jul. 7, 2020; and the contents of all of which are incorporated herein by reference as if set forth in full.

BACKGROUND OF THE INVENTION

Field of the Invention

The present disclosure relates to a storage device and a liquid ejection apparatus.

Description of the Related Art

In a liquid ejection apparatus such as an ink jet recording apparatus that ejects ink from a liquid ejection head to perform recording, normally, liquid is supplied from a storage device that stores the liquid to the liquid ejection head. As a storage device, there is a configuration in which one surface of a resin container (tank) is open and a flexible film is bonded to the container so as to cover an opening portion, mainly for the purpose of making the volume of an accommodation chamber variable and forming a flow path with a complicated shape. In the storage device having such a configuration, the film may be torn due to an external force applied to the film, for example, a sharp member may be in contact with the film during manufacturing. Further, for example, when the liquid ejection head reciprocates with the liquid ejection, due to the accompanied vibration, the bonded film and surrounding parts may be in contact with each other and rub against each other, and then the film may be deformed, creating gaps in a bonded portion and allowing liquid to leak. Therefore, Japanese Patent No. 6035867 discloses a technique for preventing the film from being torn due to friction between parts.

SUMMARY OF THE INVENTION

For example, when fixing the storage device to a main body of the liquid ejection apparatus, the storage device and the main body of the liquid ejection apparatus may be screwed together by using a fixing screw. Similar to the configuration described in Japanese Patent No. 6035867, when fixing a container whose opening portion is covered with a film to the main body of the liquid ejection apparatus, the fixing screw may penetrate the film and be screwed into the main body of the liquid ejection apparatus. In this way, a large force is applied to the film when the fixing screw penetrates the film, and the film may be damaged, or a part of the film may peel off from the end surface of the opening portion of the container, creating a gap and causing leakage of liquid. Note that there is a similar problem in a storage device for storing fluid such as gas other than liquid or powder.

An object of the present disclosure is to provide a storage device and a liquid ejection apparatus capable of suppressing film damage in a configuration in which a container whose opening portion is covered with a film is fixed by a screw.

A storage device of the present disclosure includes: a container that includes an accommodation chamber accommodating fluid or powder; a flexible film that is bonded to the container and covers an opening portion of the accommodation chamber; and a tank holder to which the container having the film bonded thereto is fixed by a screw, in which the screw penetrates the film and fixes the container to the tank holder, and a part of a bonded portion between the film and the container surrounds a portion of the film through which the screw penetrates.

Further features of the present invention will become apparent from the following description of exemplary embodiments with reference to the attached drawings.

DESCRIPTION OF THE EMBODIMENTS

An embodiment for performing the present disclosure will be described in detail with reference to the drawings. However, the dimensions, materials, shapes, or relative dispositions of the components of each configuration of the embodiments described below may be appropriately changed depending on the configuration or various conditions of a storage device and a liquid ejection apparatus to which the present disclosure is applied. The scope of the present disclosure is not limited to the embodiments described below.

First Embodiment

Figure 1:
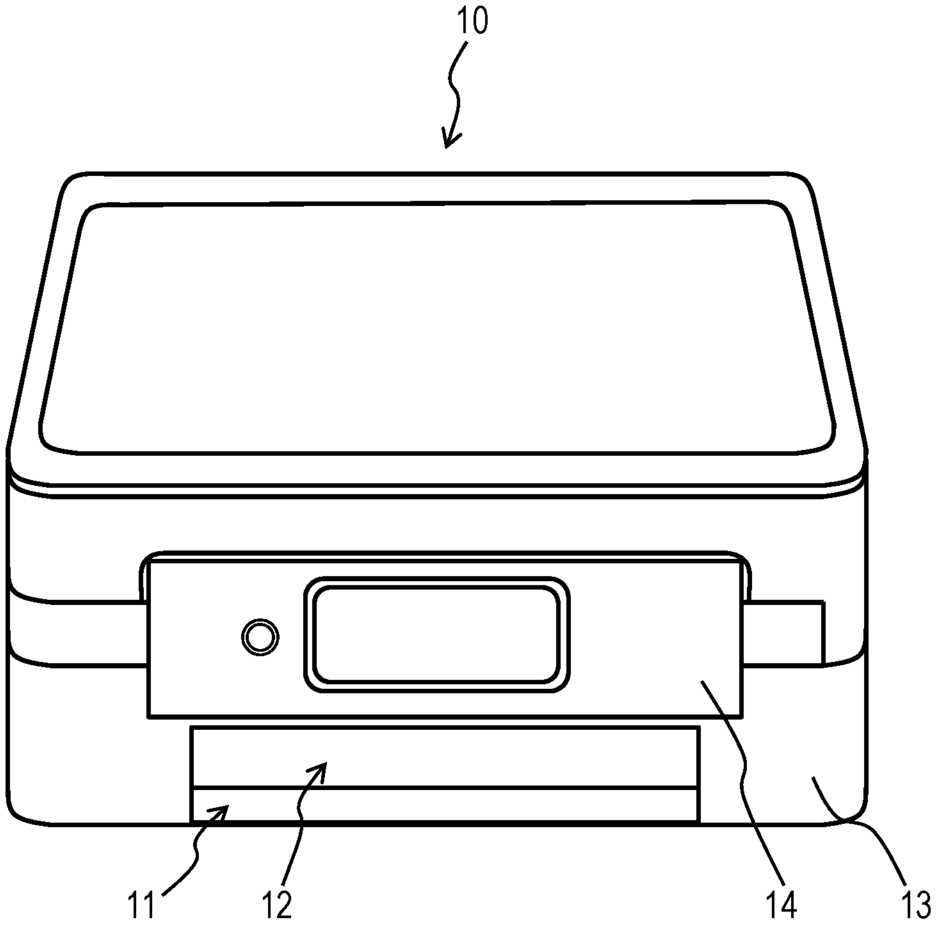
FIG. 1 is a perspective view illustrating a liquid ejection apparatus that includes a storage device according to a first embodiment of the present disclosure.
Figure 2:
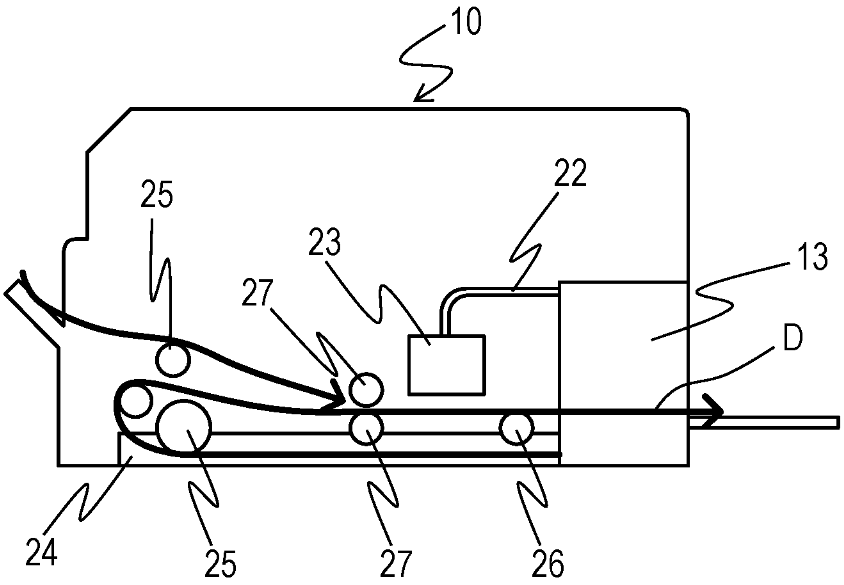
FIG. 2 is a cross-sectional view schematically illustrating a main part inside the liquid ejection apparatus illustrated in FIG. 1.

FIG. 1 is a perspective view illustrating a schematic configuration of an ink jet recording apparatus (recording apparatus) 10 which is an example of a liquid ejection apparatus including a storage device according to a first embodiment of the present disclosure. FIG. 2 is a cross-sectional view schematically illustrating a main part inside the recording apparatus 10. As illustrated in FIG. 1, the recording apparatus 10 includes a recording medium inserting portion 11 for inserting a recording medium such as a paper, a recorded material discharging portion 12 for discharging a recorded material after recording, a storage device 13 for storing fluid or powder, and an operation panel 14 operated by a user to perform a recording operation.

As illustrated in FIG. 2, a cassette 24, a paper feed roller 25, a discharge roller 26, a positioning roller 27, a liquid ejection head 23, and a tube 22 are provided inside the recording apparatus 10. The cassette 24 configures a part of the recording medium inserting portion 11 and is a box-shaped container capable of holding a plurality of stacked recording media. The cassette 24 has a slide mechanism that can be pulled out from and pushed into a main body of the liquid ejection apparatus (a main body of the recording apparatus) in the horizontal direction. When accommodating the recording medium, the cassette 24 is pulled out from the main body of the recording apparatus, and after accommodating the recording medium, the cassette 24 is pushed into the main body of the recording apparatus and set. Although not illustrated, a guide that can move in the width direction and a guide that can move in the depth direction are provided inside the cassette 24. By using these guides, the recording media of various sizes (for example, such as A4 size, or postcard size) can be at least roughly centered inside the cassette 24.

The paper feed roller 25, the discharge roller 26, and the positioning roller 27 configure a transporting mechanism of the recording medium. A rubber having a wavy pattern shape is wound around a contact surface of the paper feed roller 25 with the recording medium. The paper feed roller 25 rotates at an adjusted speed so as to pick up the recording media held in the cassette 24 one by one. The surface of the positioning roller 27 is covered with, for example, a coating material that contains ceramic particles. The positioning roller 27 utilizes the friction between the surface of the positioning roller 27 and the recording medium to transport the recording medium with high accuracy while keeping a distance between the liquid ejection head 23 and the recording medium within a certain range. The discharge roller 26 is a roller for discharging the recorded material after recording from the recorded material discharging portion 12.

The liquid ejection head 23 configures a recording portion, receives document data or image data from a computer (not illustrated) or the like, ejects droplets with high accuracy to adhere to the recording medium while moving in the width direction orthogonal to the feeding direction D (see FIG. 2) of the recording medium, and performs recording on the recording medium. The tube 22 connects the liquid ejection head 23 that moves as described above to the storage device 13 fixed to the main body of the recording apparatus, and supplies the liquid to the liquid ejection head 23.

Figure 3A:
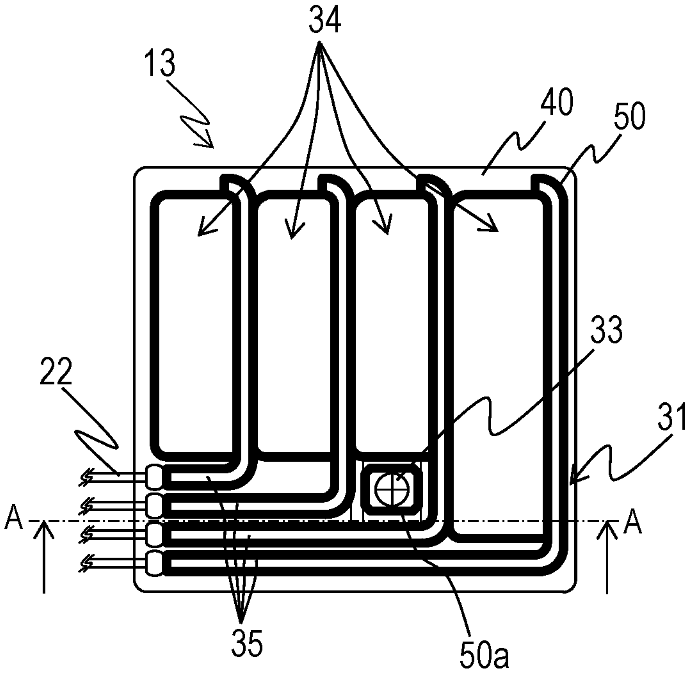
FIG. 3A is a top view of the storage device of the first embodiment of the present disclosure.
Figure 3B:
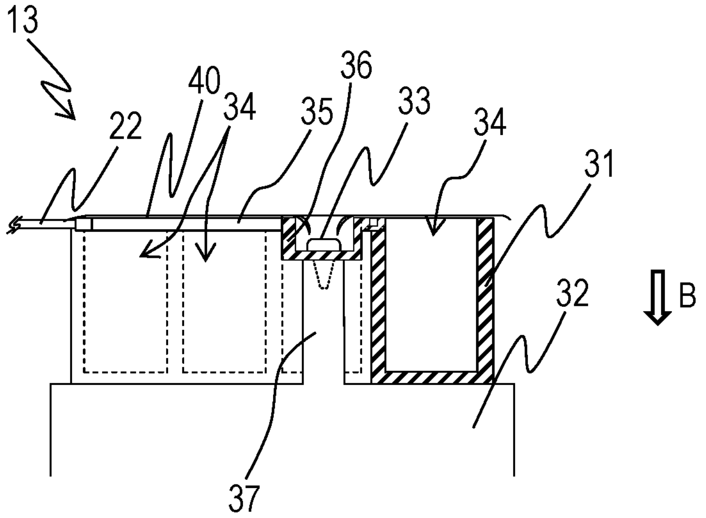
FIG. 3B is a cross-sectional view of the storage device of the first embodiment of the present disclosure.

The recording apparatus 10 of the present embodiment can perform color recording by ejecting a plurality of liquid inks having different colors. The storage device 13 has a plurality of accommodation chambers 34 partitioned so that liquid inks of each color can be separately accommodated, and each accommodation chamber 34 is individually replenished with liquids of each color from each of ink bottles (not illustrated) or the like. The configuration of the storage device 13 will be described below with reference to FIGS. 3A and 3B. FIG. 3A is a top view of the storage device 13, and FIG. 3B is a cross-sectional view taken along the line A-A in FIG. 3A. The storage device 13 includes a tank holder 32, a tank (container) 31, a film 40, and a fixing screw 33. The tank holder 32 is a structure for fixing the tank 31 to the main body of the recording apparatus and is provided with a screw hole for fixing the tank 31 to the tank holder 32. The tank 31 is a hollow structure made of resin and includes a plurality of accommodation chambers 34 for individually storing liquids of different colors (for example, four colors of yellow, cyan, magenta, and black) by partitioning the inside. Each of flow paths 35 is connected to each of accommodation chambers 34. A part of the hollow tank 31 is open to the outside, in other words, each accommodation chamber 34 has an opening portion. A flexible film 40 is attached to the tank 31 so as to collectively cover the opening portions of these accommodation chambers 34. The film 40 of the present embodiment is transparent. The bonded portion 50 of the film 40 to an end surface of the opening portion is illustrated by a thick line in FIG. 3A. By closing the opening portions with the film 40 in this way, each accommodation chamber 34 is sealed except for the flow path 35, and leakage of liquid is prevented. Each accommodation chamber 34 is connected to the tube 22 via the flow path 35.

Next, a method of assembling the storage device 13 will be described. First, the tank 31 which is a hollow resin molded product having a plurality of accommodation chambers 34 partitioned from each other is molded. At this time, the tank 31 is formed in a shape in which a part thereof is opened so that each accommodation chamber 34 has an opening portion and each opening portion is substantially positioned on one plane. The flexible film 40 punched out from one sheet wound in a roll shape with a cutter is heat welded to the end surface of each opening portion so as to collectively cover the opening portion of each accommodation chamber 34. In this way, the tank 31 and the film 40 are bonded at the bonded portion 50 illustrated by the thick line in FIG. 3A. Next, the tank 31 to which the film 40 is bonded is placed on the tank holder 32. The positions of the hole in the tank holder 32 (which may be a screw hole) and the screw hole in the tank 31 are aligned, and the fixing screw 33 penetrates the film 40 from above the film 40, passes through the hole in the tank 31, and then is screwed into the screw hole in the tank holder 32. As illustrated in FIG. 3B, the hole of the tank 31 is provided inside a recessed portion 36 recessed from the tank 31 toward the tank holder 32. The screw hole of the tank holder 32 is provided at a tip of a cylindrical portion 37 protruding toward the film 40 that is bonded to the tank 31. In this way, the tank 31 whose opening portion is covered with the film 40 is attached to the tank holder 32 to form the storage device 13. Although not illustrated, the tank holder 32 may be provided with a simple through hole instead of the screw hole and may be fixed by engaging a nut or the like with the screw 33 that penetrates the through hole.

Figure 4A:
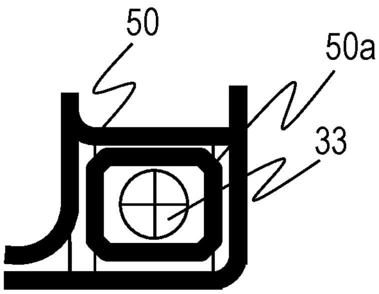
FIG. 4A is an enlarged top view illustrating the screwed portion of the storage device illustrated in FIGS. 3A and 3B.

The screwed portion of the film 40 and the tank 31, and the tank holder 32 is illustrated enlarged in FIG. 4A. The bonded portion 50 illustrated by a thick line in FIG. 3A is provided not only at a position corresponding to the contour of the accommodation chamber 34 and the flow path 35 but also at a position corresponding to the end surface of the recessed portion 36 provided with the hole through which the screw 33 penetrates. That is, a part of the bonded portion 50 between the film 40 and the tank 31 surrounds the portion of the film 40 through which the screw 33 penetrates. The bonded portion, which is at a position corresponding to the end surface of the recessed portion 36 provided with the hole through which the screw 33 penetrates and surrounds the portion of the film 40 through which the screw 33 penetrates as described above, is indicated by a reference numeral 50*a*.

The meaning of surrounding the portion of the film 40 through which the screw 33 penetrates is that the bonded portion 50*a* is formed along with the shape of the portion through which the screw 33 penetrates. Further, the "surrounding" includes not only a case where the entire circumference around the portion through which the screw 33 penetrates is surrounded but also a case of partially surrounding, that is, a case where the bonded portion 50*a* is not formed over the entire circumference. The planar shape of the bonded portion 50*a* does not include an acute-angled portion. The planar shape referred to here is a planar shape when the film 40 is viewed from the direction in which the screw 33 is inserted (the direction of the arrow B illustrated in FIG. 3B). As described above, according to the present embodiment, the bonded portion 50*a* is present not only at a position corresponding to the contour of the accommodation chamber 34 and the flow path 35 but also at a position corresponding to the end surface of the recessed portion 36 provided with the hole through which the screw 33 penetrates.

By providing the bonded portion 50*a* so as to surround the hole through which the screw 33 penetrates in this way, it is possible to suppress the film 40 from peeling off due to an external force such as twisting when the screw 33 penetrates the film 40. Even when a part of the film 40 is peeled off, the peeled off portion can be kept inside the bonded portion 50*a* on the end surface of the recessed portion 36. Further, since the bonded portion 50*a* that surrounds the portion through which the screw 33 penetrates has a planar shape that does not include an acute-angled portion, a portion that tends to be a starting point of tearing of the film 40 is not present, and damage to the film 40 can be suppressed. Therefore, according to the present embodiment, it is possible to suppress leakage of liquid due to the peeling or the damage of the film 40. The planar shape of the bonded portion 50*a*, which is formed so as to surround the portion through which the screw 33 penetrates, may be a circular form as in the modification example illustrated in FIG. 4B, or an elliptical form (not illustrated). Further, as in the modification example illustrated in FIG. 4C, the entire end surface of the recessed portion 36 having a circular form on the inner circumference and a substantially quadrangular form on the outer circumference may be a bonded portion 50*a* (illustrated in a dot pattern) having a large area. In any case, the planar shape of the bonded portion 50*a* does not include an acute-angled portion, for example, includes one or both of a linear portion and a curved portion, and the linear portion or the curved portion is connected at a right angle or an obtuse angle. As a result, tearing of the film 40 when the screw 33 penetrates the film 40 can be suppressed.

Further, the bonded portion 50*a* is present not only at a position corresponding to the contour of the accommodation chamber 34 and the flow path 35 but also at a position corresponding to the end surface of the recessed portion 36 provided with the hole through which the screw 33 penetrates, so that the bonded area between the film 40 and the tank 31 increases. As a result, there is also an effect that the film 40 is firmly fixed to the tank 31 and is not easily peeled off. The end surface of the recessed portion 36 is positioned at the same height as the end surface of the opening portion of the tank 31, and the film 40 can be smoothly attached without a step. Further, as the area of the end surface of the recessed portion 36 is larger, the bonded area between the film 40 and the tank 31 can be further increased, and the bonding strength of the film 40 can be increased. Since the recessed portion 36 is supported by the cylindrical portion 37 of the tank holder 32, there is an advantage that the bonded portion 50*a* on the end surface of the recessed portion 36 is less likely to be peeled off.

The technical significance of the configuration of the present embodiment will be described in more detail. In the liquid ejection apparatus, in order to achieve both miniaturization and an increase in the fluid storage amount, the storage device 13 having a large capacity is fixed to the main body of the liquid ejection apparatus and connected to the liquid ejection head 23 by the flexible tube 22. As a result, the limited space inside the main body of the liquid ejection apparatus is effectively utilized. Further, the recording apparatus 10 capable of color recording handles a plurality of liquids having different colors. It is preferable to form a plurality of accommodation chambers 34 in one large tank 31 in terms of space efficiency and manufacturing cost, rather than providing separate tanks for accommodating liquids of each color. When one surface of the accommodation chamber 34 is formed of the flexible film 40, it is efficient to collectively cover the opening portions of the plurality of accommodation chambers 34 with one film 40. The film 40 having a large area is used to secure a sufficient bonded area in order to collectively cover each accommodation chamber 34 and seal each accommodation chamber 34. In the storage device having such a configuration, when the tank 31 is screwed with the fixing screw 33 in order to firmly fix the tank 31 to the tank holder 32, the screw 33 penetrates the film 40 and is fixed. When the screw 33 is to be disposed so as to avoid the position where the screw 33 overlaps with the film 40, there is a possibility that a large space is required inside the main body of the liquid ejection apparatus by the amount of the screwed position, or the bonding strength is lowered to make the film 40 a small area. In order to implement good space efficiency while securing sufficient bonding strength, it is conceivable that the screw 33 for fixing the tank 31 to the tank holder 32 penetrates the film 40.

Figure 5:
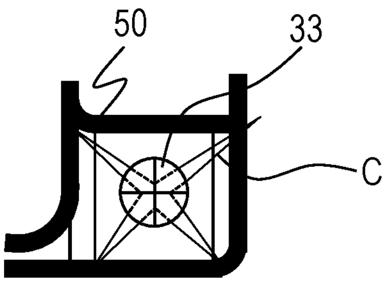
FIG. 5 is an enlarged top view illustrating a screwed portion of a storage device of a reference example.

As described above, when the screw 33 penetrates the film 40, there is a possibility that a large external force is applied to the film 40 to damage the film 40. Depending on the way of tearing of the film 40, as illustrated in the reference example schematically illustrated in FIG. 5, the crack C may reach the bonded portion 50 and break the bonded portion 50, creating a gap and causing leakage of fluid. In particular, when the planar shape of the bonded portion 50 around the screw 33 includes an acute-angled portion, the force for tightening the screw 33 is concentrated on the acute-angled portion of the bonded portion 50, and the film 40 is easily torn from that portion. Further, when a notch through which the screw 33 is inserted is formed in advance with a blade in the portion of the film 40 through which the screw 33 penetrates, there is a possibility that a part of the bonded portion 50 is cut, and the bonded portion 50 is broken from that portion, resulting in a gap that causes leakage of fluid.

Figure 4B:
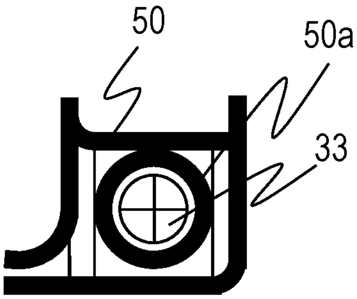
FIG. 4B is an enlarged top view illustrating the screwed portion of the storage device illustrated in FIGS. 3A and 3B.
Figure 4C:
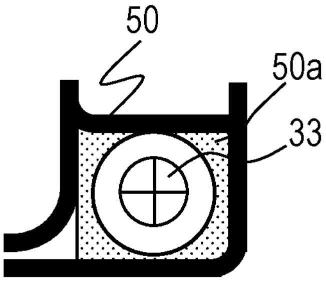
FIG. 4C is an enlarged top view illustrating the screwed portion of the storage device illustrated in FIGS. 3A and 3B.

In contrast to this, in the present embodiment illustrated in FIGS. 4A, 4B, and 4C, the bonded portion 50*a* is provided so as to surround the portion of the film 40 through which the screw 33 penetrates. As a result, even when the film 40 is partially peeled off, only the inside of the bonded portion 50*a* of the film 40 is peeled off and it is suppressed that the film 40 is peeled off to the outside of the bonded portion 50*a*. That is, it is unlikely that the peeling or the crack of the film 40 reaches the bonded portion 50 at a position corresponding to the contour of the accommodation chamber 34 and the flow path 35 outside the bonded portion 50*a* surrounding the portion through which the screw 33 penetrates. Therefore, leakage of fluid from the accommodation chamber 34 or the flow path 35 is suppressed. In particular, when the planar shape of the bonded portion 50*a* is a closed shape such as a continuous circular form, an elliptical form, or a polygonal shape, it is effective in keeping the peeling or the crack of the film 40 inside the bonded portion 50*a*. Further, the planar shape of the bonded portion 50*a* does not include an acute-angled portion, for example, includes one or both of a linear portion and a curved portion, and the linear portion or the curved portion is connected at a right angle or an obtuse angle. According to such a configuration, there is no portion where an external force is likely to be concentrated, which is effective in suppressing damage of the film 40.

Second Embodiment

Figure 6:
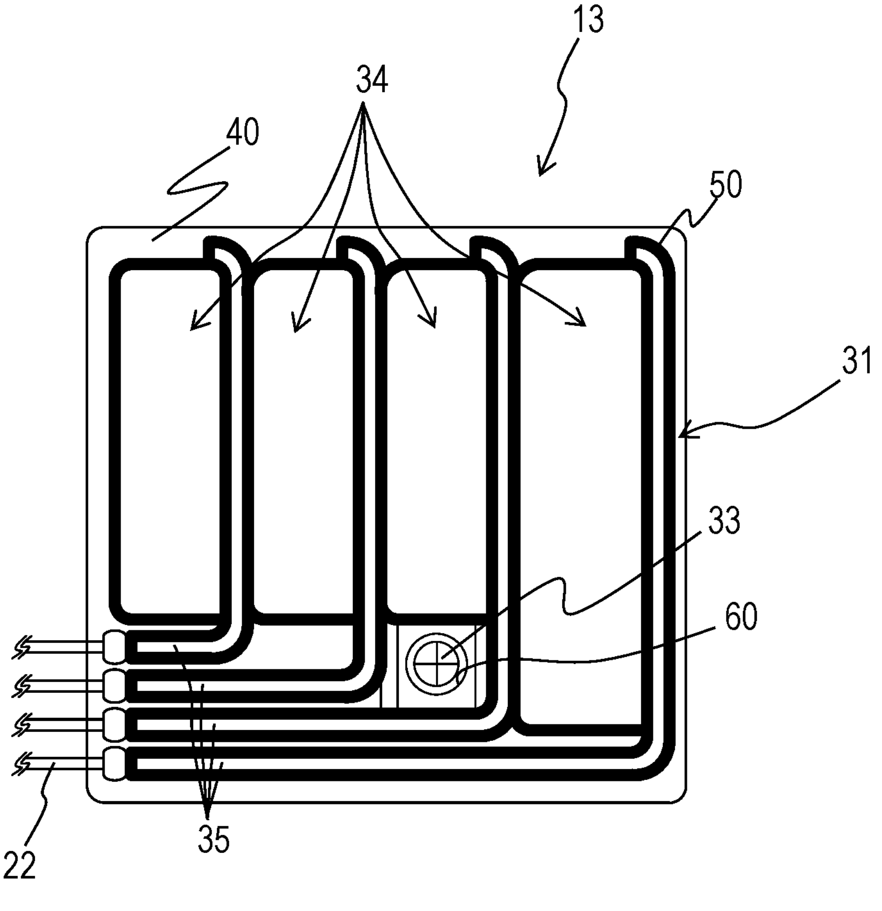
FIG. 6 is a top view of a storage device of a second embodiment of the present disclosure.

Next, a second embodiment of the present disclosure will be described with reference to FIG. 6. FIG. 6 is a top view of the storage device 13 of the present embodiment. The difference points from the first embodiment of the present embodiment will be mainly described, and the description of the same parts as those of the first embodiment will be omitted. In the present embodiment, a through hole 60, which is a hole portion including a portion of the film 40 through which the screw 33 penetrates, is formed in advance in the film 40 by a punch or the like before the film 40 is bonded to the tank 31. The through hole 60 has a planar shape that does not include an acute-angled portion and is preferably a circular hole or an elliptical hole. Further, the film 40 and the tank 31 are heat welded to each other in a state where the film 40 is taut without wrinkles, and the opening portion of the tank 31 is closed with the film 40 to seal each accommodation chamber 34. The planar shape of the through hole 60 is a circular form or an elliptical form that does not include corners and can disperse an external force applied when the film 40 is stretched so as not to cause wrinkles or kinks before bonding the film 40. As a result, the generation of gaps in the bonded portion 50 due to the wrinkles or kinks of the film 40 is suppressed, and further, since there is no corner which is a starting point for tearing the film 40, damage to the film 40 can be suppressed. On the cut surface of the through hole 60 of the film 40, for example, by performing round processing on the edge of the cut end, the strength of the film 40 against an external tensile force can be further increased. Further, when the screw 33 is fastened, the screw 33 can pass through the through hole 60 without contacting the film 40, so that the film 40 is not torn by being pulled in contact with the screw 33.

For example, when the film 40 is cut out from a sheet wound in a roll shape, the through hole 60 may be formed in the film 40 at the same time. Further, for example, the through hole 60 which is a circular hole or an elliptical hole may be formed in the film 40 by the heat of a plastic welding machine. In that case, on the cut surface of the through hole 60, the edge of the cut end becomes thicker due to the resin in which a part of the film 40 is melted, so that the strength against tearing of the film 40 can be further increased. Further, when the film 40 is heat welded to the tank 31, the through hole 60, which is a circular hole, can be formed in the film 40 by heat at the same time.

Third Embodiment

Next, a third embodiment of the present disclosure will be described with reference to FIGS. 7A, 7B, 7C, and 7D. FIGS. 7A, 7B, 7C, and 7D are top views illustrating an enlarged view of the screwed portion of the storage device 13 of the present embodiment. The difference points from the first to second embodiments of the present embodiment will be mainly described, and the description of the same parts as those of the first to second embodiments will be omitted. In the configuration illustrated in FIG. 7A, a perforation 70, which surrounds a portion of the film 40 through which the screw penetrates, is formed in advance in the film 40 by a punch or the like before the film 40 is bonded to the tank 31. The perforation 70 has a planar shape with a circular form or an elliptical form without corners. By having the perforation 70, it is possible to control the film 40 to be uniformly torn when the screw 33 penetrates the film 40. In this way, by controlling the behavior of the film 40 when the screw 33 penetrates the film 40, the cause of leakage of fluid from the accommodation chamber 34 due to the spread of tearing and peeling of the film 40 is suppressed.

Figure 7A:
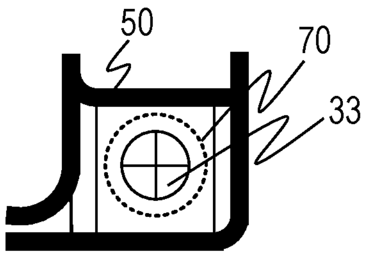
FIG. 7A is an enlarged top view illustrating a screwed portion of a storage device according to a third embodiment of the present disclosure.
Figure 7B:
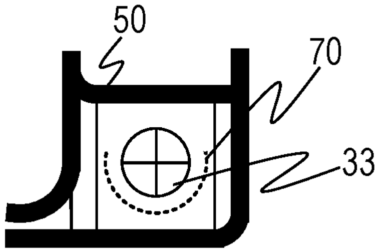
FIG. 7B is an enlarged top view illustrating the screwed portion of the storage device according to the third embodiment of the present disclosure.
Figure 7C:
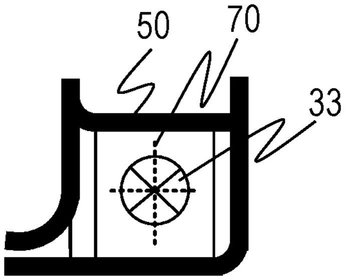
FIG. 7C is an enlarged top view illustrating the screwed portion of the storage device according to the third embodiment of the present disclosure.
Figure 7D:
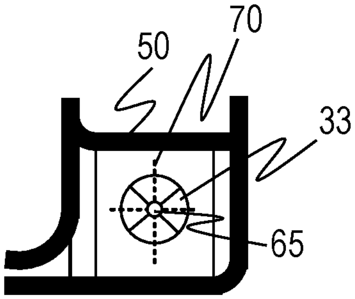
FIG. 7D is an enlarged top view illustrating the screwed portion of the storage device according to the third embodiment of the present disclosure.

As in the modification example illustrated in FIG. 7B, the perforations 70 having a planar shape with a semicircular form or a semielliptical form without corners may be formed to determine the direction in which the film 40 is torn. Further, as in the modification example illustrated in FIG. 7C, even when the perforation 70 having a planar shape that is a cross form passing through the portion of the film 40 through which the screw 33 penetrates is formed, the same effect as described above can be obtained. Further, as in the modification example illustrated in FIG. 7D, a mark 65 may be provided at the center (intersection) of the perforation 70 with a cross form. According to this modification example, in addition to the same effect as described above, there is an effect that the insertion position of the screw 33 can be easily known. In any configuration, the perforation 70 preferably has a planar shape that does not include an acute-angled portion.

The storage device 13 according to the present disclosure is not limited to the above-described each of the embodiments and modification examples thereof, and various modifications may be made without departing from the gist of the present disclosure. The present disclosure is widely applicable to the storage device 13 for accommodating not only liquid such as ink but also fluid such as gas or powder. Further, in each of the above-described embodiments, the storage device 13 includes a plurality of accommodation chambers 34 for accommodating different liquids, but the storage device 13 is not limited to such a configuration, and the present disclosure is also applicable to configurations in which the storage device 13 has only a single accommodation chamber 34. The bonded portion 50 between the film 40 and the tank 31 is not limited to heat welding and may be a portion bonded by, for example, adhesion using an adhesive.

According to the present disclosure, there is no acute-angled portion that may be the starting point of tearing of the film 40 around the portion of the film 40 through which the screw 33 penetrates. In the first embodiment of the present disclosure, the bonded portion 50*a* is provided so as to surround the portion through which the screw 33 penetrates. The planar shape of the bonded portion 50*a* does not include an acute-angled portion, for example, includes one or both of a linear portion and a curved portion, and the linear portion or the curved portion is connected at a right angle or an obtuse angle. Further, the planar shape of the bonded portion 50*a* is preferably a continuous and closed shape. According to this configuration, when the fixing screw 33 or a tool is inserted to tear the film 40 in order to fix the tank 31 to the tank holder 32, the peeling of the bonded film 40 can be suppressed.

According to the second embodiment of the present disclosure, the through hole 60, which is a circular hole or an elliptical hole, is formed in advance in the film 40 at a portion of the film 40 through which the screw 33 penetrates.

The through hole 60 does not have an acute-angled portion or a corner. Since the screw 33 passes through the through hole 60 without contacting the film 40 and fixes the tank 31 to the tank holder 32, the screw 33 does not damage the film 40 by applying an external force. Even when the screw 33 penetrates the film 40 while contacting the film 40, since the inner peripheral portion of the through hole 60 of the film 40 does not have an acute-angled portion, the film 40 is not easily deformed or damaged even when the film 40 receives a pulling force from the screw 33. Further, the film 40 and the tank 31 can be easily bonded with high accuracy.

According to the third embodiment of the present disclosure, the way of tearing of the film 40 can be controlled by forming the perforations 70 in the portion of the film 40 through which the screw 33 penetrates. As a result, the way of tearing of the film 40 when the screw 33 penetrates the film 40 is defined, and it is possible to suppress the film 40 from being unintentionally damaged and impairing the sealing property of the accommodation chamber 34.

As described above, in each embodiment of the present disclosure, when the tank 31 is fixed to the tank holder 32, damage to the film 40 by the fixing screw 33 can be prevented or suppressed. As a result, leakage of fluid or powder from the accommodation chamber 34 can be suppressed, the space inside the main body of the liquid ejection apparatus or the like can be effectively utilized, and the manufacturing cost and the complexity of manufacturing can be suppressed.

According to the present disclosure, it is possible to provide a storage device and a liquid ejection apparatus capable of suppressing film damage in a configuration in which a container whose opening portion is covered with a film is fixed by a screw.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-116901, filed Jul. 7, 2020, which is hereby incorporated by reference herein in its entirety.

What is claimed is:

1. An inkjet recording apparatus comprising:

a tank portion equipped with four liquid storage chambers each for storing liquid aligned with a first direction;

wherein each of the four liquid storage chambers has an opening and a film is affixed to cover the opening, and wherein the four liquid storage chambers include a first liquid storage chamber located at one end of the first direction and a second liquid storage chamber adjacent to the first liquid storage chamber; and a housing forming the first liquid storage chamber has a through-hole, and by inserting a screw into the through-hole, the tank portion containing the first liquid storage chamber is attached to the inkjet recording apparatus, wherein when the tank portion in the state of use of the inkjet recording apparatus is viewed from a vertical direction, a length in the first direction of the first liquid storage chamber is longer than a length in the first direction of the second liquid storage chamber, and a length in a second direction perpendicular to the first direction of the first liquid storage chamber is longer than a length in the second direction of the second liquid storage chamber.

2. The inkjet recording apparatus according to claim 1, wherein the length in the first direction of the first liquid storage chamber and the length in the second direction of the first liquid storage chamber corresponds to a length between inner walls that form the first liquid storage chamber, wherein the length in the first direction of the second liquid storage chamber and the length in the second direction of the second liquid storage chamber corresponds to a length between inner walls that form the second liquid storage chamber.

3. The inkjet recording apparatus according to claim 2, further comprising a tank holder having a screw hole, and the tank portion is attached to the inkjet recording apparatus by fitting a screw inserted in the through-hole to the screw hole.

4. The inkjet recording apparatus according to claim 3, wherein the direction in which the screw is inserted in the screw hole is substantially perpendicular to the main surface of the film.

5. The inkjet recording apparatus according to claim 4, wherein the end of the film extends from the opening.

6. The inkjet recording apparatus according to claim 5, wherein an end portion of the film protruding from the opening is located in the vicinity of the through-hole.

7. The inkjet recording apparatus according to claim 6, wherein the four liquid storage chambers contain liquids of different colors.

8. The inkjet recording apparatus according to claim 7, further comprising a liquid ejection head that ejects liquid while moving in the first direction.

9. The inkjet recording apparatus according to claim 8, further comprising four channel members, each of the four liquid storage chambers being connected to the liquid ejection head through a respective one of the four channel members, wherein each of the four channel members includes a first member that connects with the liquid storage chamber, a second member that connects with the liquid ejection head, and a connection member that connects the first member and the second member.

10. The inkjet recording apparatus according to claim 9, wherein the second member is a flexible tube.

11. The inkjet recording apparatus according to claim 10, wherein a length of the first member connected to the first liquid storage chamber located at the end of the four parallel liquid storage chambers is longer than a length of the first member connected to the second liquid storage chamber adjacent to the first liquid storage chamber.

12. The inkjet recording apparatus according to claim 11, wherein at least one of the liquid storage chambers is in contact with the film affixed to an opening of an adjacent one of the liquid storage chambers.

13. The inkjet recording apparatus according to claim 12, wherein the four first members have bent portions.

* * * * *